United States Patent
Wuebbolt-Gorbatenko et al.

(10) Patent No.: US 12,391,311 B2
(45) Date of Patent: Aug. 19, 2025

(54) MOTOR VEHICLE AND METHOD FOR STEERING A MOTOR VEHICLE

(71) Applicant: Schaeffler Technologies AG & Co. KG, Herzogenaurach (DE)

(72) Inventors: Benjamin Wuebbolt-Gorbatenko, Erlangen (DE); Manfred Kraus, Herzogenaurach (DE); Andreas Wöllner, Nuremberg (DE); Christian Harkort, Erlangen (DE); Simon Mersmann, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 799 days.

(21) Appl. No.: 17/287,553

(22) PCT Filed: Sep. 9, 2019

(86) PCT No.: PCT/DE2019/100799
§ 371 (c)(1),
(2) Date: Apr. 22, 2021

(87) PCT Pub. No.: WO2020/094172
PCT Pub. Date: May 14, 2020

(65) Prior Publication Data
US 2021/0380166 A1 Dec. 9, 2021

(30) Foreign Application Priority Data
Nov. 7, 2018 (DE) .......................... 102018127731.8

(51) Int. Cl.
*B62D 7/15* (2006.01)
*B62D 7/09* (2006.01)
*B62D 9/00* (2006.01)

(52) U.S. Cl.
CPC ............. *B62D 7/1509* (2013.01); *B62D 7/09* (2013.01); *B62D 9/00* (2013.01)

(58) Field of Classification Search
CPC ........... B62D 7/1509; B62D 7/09; B62D 9/00
(Continued)

(56) References Cited

U.S. PATENT DOCUMENTS 8,302,728 B1 11/2012 Dotson
9,834,249 B2 12/2017 Ishikawa et al.
(Continued)

FOREIGN PATENT DOCUMENTS

CN 101321644 A 12/2008
CN 102673642 A 9/2012
(Continued)

OTHER PUBLICATIONS

DriveSpark, "How to Convert a Car Into Electric by Protean Drive—DriveSpark," published by YouTube on Jan. 7, 2018, available at https://www.youtube.com/watch?v=vSz-en0mhlc (Year: 2018).*
(Continued)

*Primary Examiner* — Christopher B Wehrly

(57) ABSTRACT

A motor vehicle (10), in particular an autonomous motor vehicle, includes a steering system (38, 30), a plurality of wheels (18, 20) that can be steered by means of the steering system (28, 30), and wheel housings (24, 26) for said wheels (18, 20). The steering system (28, 30) is designed such that the steering system steers the steerable wheels (18, 20) of a wheel pair in question in the same direction, in the case of joint steering to the left or right at a steering angle α up to a limit angle $\alpha_g$ defined by the shape of the corresponding wheel housings (24, 26), and in opposite directions, in the case of steering to the left or right at a steering angle α exceeding the limit angle $\alpha_g$.

18 Claims, 1 Drawing Sheet

(58) Field of Classification Search
USPC .............................. 180/236, 402, 6.48, 6.5
See application file for complete search history.

(56) References Cited

U.S. PATENT DOCUMENTS

| | | | |
|---|---|---|---|
| 2006/0261214 A1 | 11/2006 | Wallner | |
| 2009/0045004 A1 | 2/2009 | Panizzolo | |
| 2009/0178876 A1 | 7/2009 | Miki | |
| 2010/0324782 A1* | 12/2010 | Gupta | B60W 30/18009 701/41 |
| 2013/0098695 A1* | 4/2013 | Itou | B60K 17/356 180/211 |
| 2015/0014952 A1 | 1/2015 | Morikawa | |
| 2016/0236710 A1 | 8/2016 | Ohba et al. | |
| 2016/0288828 A1* | 10/2016 | Ohba | B62D 7/09 |

FOREIGN PATENT DOCUMENTS

| | | |
|---|---|---|
| CN | 103481945 A | 1/2014 |
| CN | 105636855 A | 6/2016 |
| DE | 102013210044 | 12/2013 |
| EP | 0143861 A1 | 6/1985 |
| EP | 2824016 | 1/2015 |
| FR | 750398 A * | 5/1932 |
| FR | 750398 | 8/1933 |
| FR | 750600 | 8/1993 |
| JP | 2008239096 A | 10/2008 |
| JP | 201622756 | 2/2016 |
| JP | 2016022756 A | 2/2016 |
| WO | 2018188865 A1 | 10/2018 |

OTHER PUBLICATIONS

FR_750398_A translation (Year: 1932).*

* cited by examiner

MOTOR VEHICLE AND METHOD FOR STEERING A MOTOR VEHICLE

CROSS-REFERENCE TO RELATED APPLICATIONS

This application is the U.S. National Phase of PCT Appln. No. PCT/DE2019/100799 filed Sep. 9, 2019, which claims priority to DE 102018127731.8 filed Nov. 7, 2018, the entire disclosures of which are incorporated by reference herein.

TECHNICAL FIELD

The disclosure relates to a motor vehicle, in particular an autonomous motor vehicle, comprising a steering system, a plurality of wheels that can be steered by means of the steering system, and wheel housings for said wheels. The disclosure further relates to a method for steering a motor vehicle of this type and to a computer program product for carrying out the method.

BACKGROUND

In a motor vehicle, the wheels are generally arranged in two tracks. If the wheels of the vehicle are not constrained to a rail or some other guide, at least two of the wheels can generally be actively steered by means of a steering system, i.e., they can be pivoted relative to the respective track. Such a motor vehicle is usually a motor vehicle for driving on the road, that is to say a road vehicle. A commercially available passenger vehicle is thus such a motor vehicle. Likewise, a truck, a bus, etc.

An autonomous motor vehicle or self-driving motor vehicle is a motor vehicle that can drive, control, and park without the influence of a human driver (highly automated driving or autonomous driving). An autonomous passenger transport vehicle is also known as an (autonomous) people mover. In this context, autonomous means that none of the people being transported controls the vehicle, but rather that the passenger transport vehicle is self-controlled or automatically controlled. Thus, the people transported are usually "only" passengers.

With the integration of the electric drive in the individual wheels and with the combination of individually driven and steerable wheels (wheel modules), new possibilities arise in terms of vehicle maneuverability in confined spaces. For example, the smallest parking spaces can be used by parking across the direction of travel. This is made possible, for example, by an electric actuator integrated into the wheel module for steering, enabling a steering angle of up to 90°.

In motor vehicles of this type, great maneuverability, together with a compact design, are often desired.

The publications JP 2016-22756 A, U.S. Pat. No. 9,834,249 B2 and US 2016/0236710 A1 show various vehicles with steering systems that enable large steering angles and thus great maneuverability of the corresponding vehicles. For this purpose, however, the wheels or wheel modules require appropriate space for steering.

SUMMARY

It is desirable to provide measures which allow great maneuverability in the motor vehicle with a compact construction of the motor vehicle.

In a motor vehicle, in particular an autonomous motor vehicle, having a steering system, multiple wheels which can be steered by means of the steering system and wheel housings for these wheels. The steering system is designed in such a way that the steering wheel steers the steerable wheels of a wheel pair in question in the same direction, in the case of joint steering to the left or right at a steering angle $\alpha$ up to a limit angle $\alpha_g$ in question defined by the shape of the corresponding wheel housings, and in opposite directions, in the case of steering to the left or right at a steering angle $\alpha$ exceeding the limit angle $\alpha_g$. In this manner, the steering angle can still be selected from the range $0° \leq \alpha \leq 90°$, wherein the corresponding wheel housings can now be dimensioned smaller. Depending on their shape, these smaller wheel housings then determine the limit angle $\alpha_g$. The limit angle is then in the range $30° \leq \alpha_g \leq 60°$. All angle specifications relate to straight-line drive and are only defined to be positive regardless of the steering direction, i.e., to be understood as absolute angle values.

According to a preferred embodiment, the limit angle $\alpha_g$ is in the range $40° \leq \alpha_g \leq 50°$, in particular $45°$. When the limit angle is selected in this angular range, the corresponding wheel housings can be designed to be particularly compact.

The motor vehicle may be an autonomous passenger transport vehicle. An autonomous passenger transport vehicle is also known as an (autonomous) people mover. In this context, autonomous means that none of the people being transported controls the vehicle, but rather that the passenger transport vehicle is self-controlled or automatically controlled.

The steering may have at least one interface for control by a control module for autonomous driving. Such a configuration arises for the autonomous motor vehicle and in particular also for the autonomous passenger transport vehicle.

The steering may be a steering knuckle steering. The corresponding steering knuckles determine the axis of rotation when steering. This steering axis of rotation is usually located outside the wheels.

The motor vehicle may have an electric or hybrid drive system. In particular, the vehicle may utilize wheel hub (electric) motors.

Furthermore, the actively steerable wheels may be driven wheels, in particular wheels driven by means of a wheel hub motor.

In the method the steerable wheels of a wheel pair in question are steered in the same direction, in the case of joint steering to the left or right at a steering angle $\alpha$ up to a limit angle $\alpha_g$ in question defined by the shape of the corresponding wheel housings, and in opposite directions, in the case of steering to the left or right at a steering angle $\alpha$ exceeding the limit angle $\alpha_g$.

The limit angle may be in the range $40° \leq \alpha \leq 50°$, particularly preferably $45°$.

The embodiments mentioned above for the multi-track motor vehicle also apply accordingly to the method for steering a motor vehicle which has a plurality of steerable wheels and wheel housings for these wheels.

A computer program product includes program parts that are loaded into a processor of a computer-based control module, in particular a computer-based control module for autonomous driving, to carry out the aforementioned method.

BRIEF DESCRIPTION OF THE DRAWINGS

In the following, the method is explained by way of example with reference to the accompanying drawings using preferred exemplary embodiments. In the figures.

DETAILED DESCRIPTION

Figure 1:
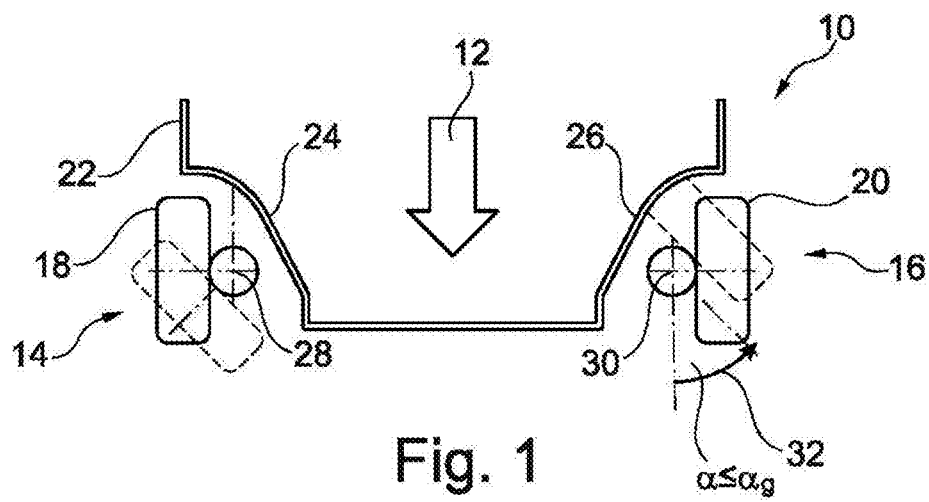
FIG. 1: shows a schematic representation of a front area of a motor vehicle with parallel, slightly turned, steerable wheels.

FIG. 1 shows the front area of a vehicle 10 in a schematic representation. The forward direction of travel is indicated by an arrow 12. The vehicle 10 is, for example, a passenger vehicle or some other motor vehicle. The motor vehicle can in particular be a motor vehicle for autonomous driving, such as an autonomous passenger transport vehicle.

The vehicle 10 shown here is a two-track vehicle 10, having two wheel modules 14, 16, each with a steerable wheel 18, 20 in its front area. The wheels 18, 20 shown here can be steered by means of a steering system of the vehicle 10 (only shown in a few parts). In addition to the wheel modules 14, 16, the front area of a car body 22 of the vehicle 10 is also shown. This car body 22 forms a wheel housing 24, 26 (often also called wheelhouse) for each of the wheel modules 14, 16.

Said steering is a type of steering knuckle steering that has a steering knuckle 28, 30 for each of the wheels 18, 20, defining the steering axis of rotation about which the respective steerable wheel 18, 20 can be steered to the right or left.

One of the wheel modules 14 thus has the wheel 18 and the steering knuckle 28, and the other one of the wheel modules 16 has the wheel 20 and the steering knuckle 30. When driving straight ahead, these are built and arranged in mirror image to one another.

FIG. 1 now shows the front area of the motor vehicle 10—on the one hand, with the steerable wheels 18, 20 when driving straight ahead, on the other hand, with the steerable wheels 18, 20 turned slightly to the left parallel in the same direction. The steering direction is shown as arrow 32. The steering angle α is very close to a limit angle $α_g$ determined by the shape of the corresponding wheel housing 26.

Figure 2:
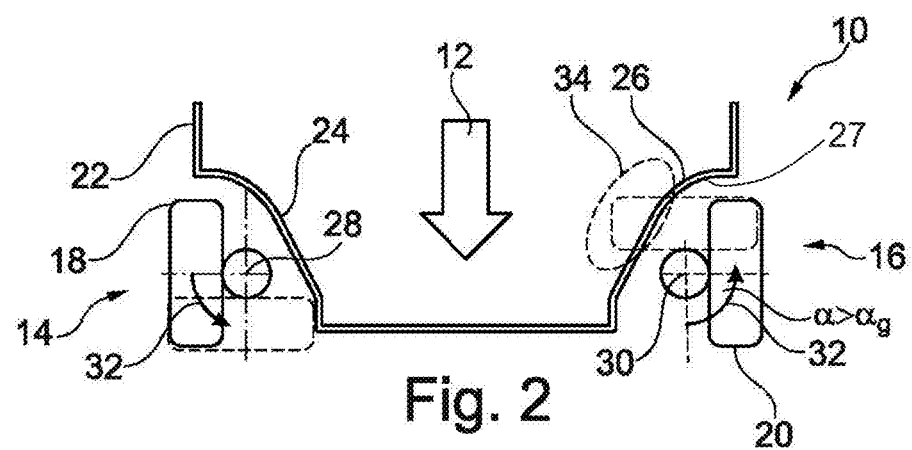
FIG. 2: shows a schematic representation of a front area of parallel steerable wheels, strongly turned in the same direction.

FIG. 2 now shows the front area of the motor vehicle 10—on the one hand, with the steerable wheels 18, 20 when driving straight ahead, on the other hand, with the steerable wheels 18, 20 turned slightly to the left parallel in the same direction. In contrast to FIG. 1, however, the steering angle α is greater than the limit angle $α_g$, determined by the shape of the corresponding wheel housing 26. The lack of a corresponding installation space can be seen in the area 34, as a result of which such a wide, co-directional turning with a steering angle $α>α_g$ is not possible with this type of construction of the wheel housing 26.

Figure 3:
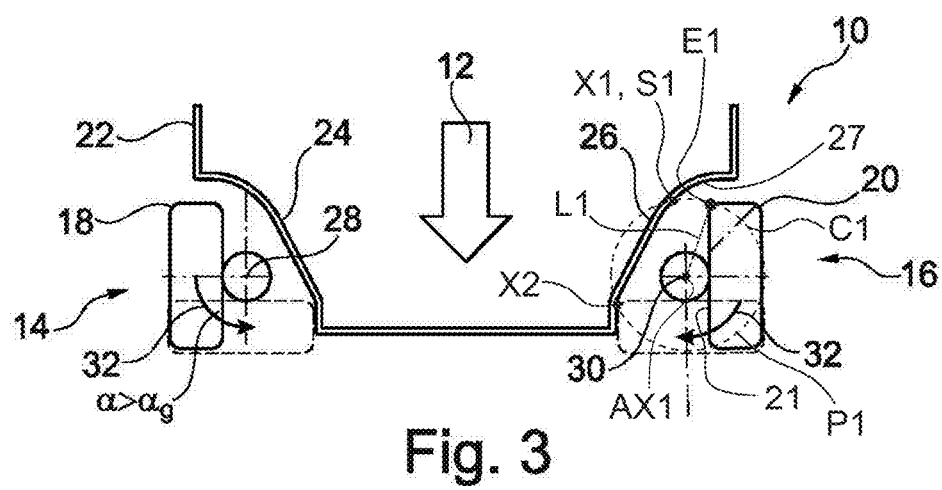
FIG. 3 shows a schematic representation of a front area of the motor vehicle as shown in FIG. 1 with steerable wheels, turned very strongly antiparallel.

In order to enable turning with a steering angle $α>α_g$ despite the predetermined shape of the wheel housings 24, 26, the steerable wheels 18, 20 are turned in oppo-site directions (parallel) at a steering angle $α>α_g$. This is shown in FIG. 3 for the steering angle α≈90°, that is to say an angle $α>>α_g$. Both steerable wheels 18, 20 of the wheel pair are again guided essentially in parallel for a subsequent drive (for example as part of a parking process).

This results in the following procedure for steering the motor vehicle 10, in which the steerable wheels 18, 20 are guided essentially parallel in pairs, at least when driving: The steerable wheels 18, 20 of the pair of wheels are turned in the same direction when steering in the case of joint steering to the left or right at α steering angle α up to a limit angle $α_g$ in question defined by the shape of the corresponding wheel housings 24, 26, and in opposite directions, in the case of steering to the left or right at a steering angle α exceeding the limit angle $α_g$.

In the following, important aspects of the method shall be described again in other words.

An installation space-optimized arrangement for the wheel module/vehicle wheel is proposed. In particular, a steering method is proposed which comprises steering the wheels 18, 20 in opposite directions, so that the respective wheel housing 24, 26 can be designed to optimize installation space.

This results in the following features:
  The vehicle has a steering device which enables the wheels of a vehicle axle to steer in opposite directions;
  During "normal" travel, the wheels 18, 20 on one axle are preferably turned in the same direction;
  During perpendicular parking, with a wheel angle of about 90°, the wheels 18, 20 of an axle are turned in opposite directions.

FIG. 2 shows the underlying problem with a wheel arrangement with a 90° steering angle. When the wheels are turned in the same direction, the right front wheel 18 partially moves out of the wheel housing 24 and therefore does not require any additional installation space, while the left front wheel 20 swivels into the wheel housing 26 and collides with the wheel housing contour of the wheel housing 26.

The "collision" is prevented by the wheels 18, 20 of each axle turning in opposite directions.

FIG. 3 shows the advantages of the opposite steering angle in comparison: both wheels 18, 20 are pivoted out of the respective wheel housing 24, 26 when the steering angle is opposite and require no additional installation space.

The pivoting out of the wheels 18, 20 is based on the correspondingly coordinated wheel kinematics: the wheel contact point of each steered wheel 18, 20 describes a path around the circle created by the disturbance force lever arm. The representations make it clear that only a counter-rotation ensures that the wheels 18, 20 pivot out of the wheel housing 24, 26. The wheel contact points here are located on a line or plane that is perpendicular to the vehicle axis.

In contrast thereto, when the wheel is turned in the same direction, the circular movement around the disturbance force lever arm creates an offset between the two wheel contact points: the wheel contact point of the left front wheel (VL) 20 is pivoted inwards around the circle and moves it towards the inner contour of the wheel housing (into the wheel housing 26).

FIG. 3 shows a line L1 that extends from a steering axis of rotation AX1 to a radial outermost extent E1 of the left front wheel 20. The line L1 particularly extends to a radial outermost extent E1 of an axial inner face 21 of the left front wheel 20. The line L1 forms a radius of a circle C1. The circle C1 intersects, or crosses through, or extends through, or passes through an inner contour 27 of the wheel housing 26 at a first intersection point X1 and at a second intersection point X2. A first intersection point X1 defines a collision point S1 between the left front wheel 20 and an inner contour 27 of the wheel housing 26. A wheel pathway P1 resides within a portion of the circle C1 that extends from the first intersection point X1 to the second intersection point X2 (in a clockwise direction relative to FIG. 3). The previously described geometric traits and relationships applied to the left front wheel 20 and the corresponding wheel housing 26 can also be applied to right front wheel 18 and the corresponding wheel housing 24.

LIST OF REFERENCE SYMBOLS

10 Vehicle
12 Arrow (direction of travel)
14 Wheel module
16 Wheel module
18 Wheel
20 Wheel
21 Inner axial face of wheel
22 Vehicle body
24 Wheel housing
26 Wheel housing
27 Inner contour of wheel housing
28 Steering knuckle with axle
30 Steering knuckle with axle
32 Steering direction
34 Lack of installation space
α Steering angle
$\alpha_g$ Limit angle
AX1 Steering axis of rotation
C1 Circle
E1 Radial outermost extent
L1 Line
P1 Wheel pathway
X1 Intersection point
X2 Intersection point
S1 Collision point

The invention claimed is:

1. A motor vehicle having a steering system, a plurality of wheels which can be steered via the steering system, and wheel housings for the plurality of wheels, wherein:
the steering system is configured to steer a wheel pair of the plurality of wheels in a same direction for a steering angle a up to a limit angle $\alpha_g$, and in opposite directions for a steering angle α exceeding the limit angle $\alpha_g$, and a shape of the wheel housings define the limit angle $\alpha_g$; and
wherein when the steering angle a exceeds the limit angle ag, a first wheel of the wheel pair and a second wheel of the wheel pair are configured to be steered so that the first wheel and the second wheel are parallel to each other.

2. The motor vehicle according to claim 1, wherein the limit angle is in a range defined by $40° \leq \alpha_g \leq 50°$.

3. The motor vehicle according to claim 1, wherein the motor vehicle is an autonomous passenger transport vehicle.

4. The motor vehicle according to claim 1, wherein the steering system has at least one interface for control by a control module for autonomous driving.

5. The motor vehicle according to claim 1, wherein the motor vehicle comprises an electric or hybrid drive system.

6. The motor vehicle according to claim 1, wherein the wheel pair is driven by a hub motor.

7. A method for steering a motor vehicle, the motor vehicle having a plurality of steerable wheels, the method comprising:
steering a wheel pair of the plurality of steerable wheels in a same direction at a steering angle α up to a limit angle $\alpha_g$, and in opposite directions when the steering angle α exceeds the limit angle $\alpha_g$, and
wherein:
a first wheel of the wheel pair: i) is disposed within a first wheel housing, and ii) is configured to rotate about a first steering axis of rotation, and
a first line extends from the first steering axis of rotation to a radially outermost extent of the first wheel, the first line defining a radius of a first circle, the first circle:
defining a wheel pathway of the first wheel, and extending through an inner contour of the first wheel housing, and
the wheel pathway of the first wheel and a shape of the first wheel housing define the limit angle $\alpha_g$; and
wherein when the steering angle α exceeds the limit angle $\alpha_g$, the first wheel is configured to move to a steering angle α of 90 degrees.

8. The method according to claim 7, wherein the limit angle is in a range defined by $40° \leq \alpha_g \leq 50°$.

9. A non-transitory computer readable medium of a control module configured for autonomous driving, the non-transitory computer readable medium having stored thereon a computer program configured for carrying out the method according to claim 7.

10. A motor vehicle comprising:
a left steerable wheel having a left steering axis of rotation and a corresponding left wheel housing;
a right steerable wheel having a right steering axis of rotation and a corresponding right wheel housing;
a steering system configured to:
in response to a commanded left steering angle less than a threshold, steer both the left and the right steerable wheels toward the left, and
in response to a commanded left steering angle greater than the threshold, steer the right steerable wheel toward the left and steer the left steerable wheel toward the right such that the right steerable wheel is parallel to the left steerable wheel; and
a line extending from a left steering axis of rotation to a radial outermost extent of the left steerable wheel, the line defining a radius of a circle, the circle:
defining a wheel pathway of the left steerable wheel, and
extending through an inner contour of the left wheel housing, and the wheel pathway and a shape of the left wheel housing define the threshold.

11. The motor vehicle according to claim 10 wherein the steering system is further configured to:
in response to a commanded right steering angle less than the threshold, steer both the left and the right steerable wheels toward the right, and
in response to a commanded right steering angle greater than the threshold, steer the right steerable wheel toward the left and steer the left steerable wheel toward the right.

12. The motor vehicle according to claim 10, wherein the threshold is between 40° and 50°.

13. The motor vehicle according to claim 10, wherein the left and the right steerable wheels are each driven by a hub motor.

14. The method according to claim 7, wherein the first line extends from the first steering axis of rotation to a radially outermost extent of an inner axial face of the first wheel.

15. The method according to claim 7, wherein the first circle defines a collision point between the first wheel and the inner contour of the first wheel housing.

16. The method according to claim 7, wherein the first circle extends through the inner contour of the first wheel housing at a first intersection point and at a second intersection point.

17. The method according to claim 16, wherein at least a portion of the circle that extends between the first intersection point and the second intersection point includes the wheel pathway of the first wheel.

18. The method according to claim 7, wherein:
   a second wheel of the wheel pair: i) is disposed within a second wheel housing, and ii) is configured to rotate about a second steering axis of rotation, and
   a second line extends from the second steering axis of rotation to a radially outermost extent of the second wheel, the second line defining a radius of a second circle, the second circle:
      defining a wheel pathway of the second wheel, and
      extending through an inner contour of the second wheel housing.

\* \* \* \* \*